United States Patent [19]

Dax

[11] Patent Number: 5,337,056
[45] Date of Patent: Aug. 9, 1994

[54] DYNAMICALLY TUNABLE NOTCH FILTER

[75] Inventor: Clifford D. Dax, Mission Viejo, Calif.

[73] Assignee: Rockwell International Corporation, Seal Beach, Calif.

[21] Appl. No.: 74,621

[22] Filed: Jun. 11, 1993

[51] Int. Cl.⁵ .............................................. G01C 3/08
[52] U.S. Cl. ................................... 342/128; 342/132; 356/5
[58] Field of Search .................. 342/122, 128, 132; 356/4, 5, 4.5

[56] References Cited

U.S. PATENT DOCUMENTS

| | | | |
|---|---|---|---|
| 4,176,351 | 11/1979 | DeVita et al. | 342/128 |
| 4,404,562 | 9/1983 | Kretschmer, Jr. et al. | 342/132 |
| 4,620,192 | 10/1986 | Collins | 342/128 |
| 4,957,362 | 9/1990 | Peterson | 356/5 |

OTHER PUBLICATIONS

Merrimac, Custom Integrated Assemblies–Image Reject Mixers, p. 14.

*Primary Examiner*—Mark Hellner
*Attorney, Agent, or Firm*—H. Fredrick Hamann; George A. Montanye; Philip K. Yu

[57] ABSTRACT

A dynamically tunable notch filter is used within a continuously transmitting laser radar system for filtering narcissus signals generated from a continuous linear frequency modulated chirp transmission signal at the transmission aperture antenna with the filter including mixing and band pass filtering at the narcissus dynamic frequency to eliminate the unwanted narcissus signals varying over the dynamic frequency range of the narcissus signals, and to also eliminate unwanted target images, for improved resolution and detection of low level reflected target signals which are often obscured by the presence of the relatively high-level unwanted narcissus signals.

14 Claims, 5 Drawing Sheets

OPTICAL INPUT SIGNAL (10)

OPTICAL DEMOD MIXER (54 & 56)

BAND PASS FILTER (22&24)

SECOND MIXER (28)

OUTPUT SIGNAL (32)

DYNAMICALLY TUNABLE NOTCH FILTER

FIELD OF INVENTION

The present invention relates to electro-optical signal processing. Specifically, the present invention relates to an improved narcissus filter, that is, a filter designed to eliminate unwanted narcissus signals reflected near a transmitting apparatus. The narcissus signals tend to obscure wanted reflected target signals, particularly applicable to continuous transmission laser radar systems. More specifically, the present invention relates a narcissus notch filter which is dynamically tunable to follow and thereby match the dynamic frequency of the narcissus signal so that the narcissus signal is more effectively filtered over the narciscus frequency range varying through the same frequency range of a continuous linear frequency modulated chirp pulse transmitted signal.

BACKGROUND OF THE INVENTION

Laser radars have been adapted to transmit a continuous linear frequency modulated chirp pulse signal through the radar antenna aperture used for both transmission and reception for obvious cost and space savings. Higher and continuously improved resolution of three dimensional range image detection through pixelized laser radar is desired for better identification of targets. For example, there is a continuing desire to more accurately detect the size and shape of unidentified flying targets in the far field so as to better distinguish their differences, for example, the difference in size and shape of different aircraft.

Laser radars continuously transmitting linear frequency modulated chirp signals can be used to generate more precise pixelized three dimensional images for improved target recognition. In such laser radar systems, the transmitted and received signals propagate simultaneously through same antenna aperture. Retroreflection of the transmitted signals at the transmission antenna generates unwanted noise signals commonly known as narcissus signals which can be 50 db higher than the desired reflected target signals. The narcissus signals, that is, the optical feedback, are generated by various physical phenomenon. The narcissus signals are generated by back-scattering caused by imperfection in and debris on the antenna surface, are generated by retro-reflection from the antenna, and are generated by diffraction from the transmitter, as is well known.

The simultaneous transmission and reception through the same antenna aperture in combination with the back-scattering, retro reflection and diffraction of the transmitted signals at the antenna aperture create large unwanted narcissus signals tending to obscure reflected target signals thereby creating a continuing need to improve the filtering of such unwanted narcissus signals. The unwanted narcissus signals are so large in comparison to the reflected target signals that they tend to swamp out or completely obscure the desired reflected target signal limiting improved target resolution, recognition and identification, as is well known. Thus, there exists a continuing need to improve narcissus filtering particularly useful in continuous laser radar systems.

Typically, the laser transmitter projects a diverging beam onto the antenna lens which then projects a collimated laser beam into the far field to reflect off of the target of interest. The lens further acts to focus the received reflected target signal from the far field upon a receiving diplexer directing the received target signal onto a detector. Thus, the laser transmit and target receive signals continuously and simultaneously traveling through the same antenna focal space between the antenna lens and the laser transmitter. The narcissus signals also continuously and simultaneously flood this same focal space. A diplexer, e.g., a polarized sensitive mirror, disposed between the laser transmitter and the antenna lens allows the transmit signal to propagate to the lens, while reflecting the received target signal onto an optical detector. However, the diplexer not only directs the target signal onto the detector, but also directs a significant portion of the narcissus signal onto the optical detector, with the unwanted narcissus signals tending to swamp out and obscure the desired target signal.

Detectors will generate noise due to their quantum mechanics and have an inherent dynamic range between the maximum signal processed and the noise level generated. It is desired that the narcissus signal be filtered to below the noise level of the detector so that the narcissus signal is reduced as much as possible to improve the detection of the target signal. Taking advantage of the entire dynamic range of the detector achieves maximum narcissus filtering possible to improve the ability to detect the target signal. Thus, target signal detection is detector-noise limited and the maximum narcissus filtering possible is limited to the dynamic range of the input detectors. Optical detectors have a higher dynamic range than RF detectors, and the optical detectors enable superior narcissus filtering over the RF detectors. Hence, there exists a continuing need to provide narcissus rejection filtering with better than 50 db in attenuation using detectors with the highest dynamic range in excess of 50 db to allow sufficient and maximum possible narcissus filtering to detect as best possible the target signal.

Various types of electronic narcissus filtering have been used including cancellation and fixed frequency narcissus notch filtering. Cancellation is performed by generating a signal which is equal in amplitude, but opposite in phase to the narcissus signal such that by summing the two, the narcissus signal is canceled and reduced. However, the cancellation method has been shown to provide up to 40 db maximum attenuation and is insufficient to remove the 50 db relative signal difference between the target signal and the narcissus signal. Moreover, for cancellation to function properly, the amplitude and the frequency of the narcissus signal must be known at all times. The amplitude and dynamic frequency of the narcissus is difficult to predict or accurately determine at all times with sufficient precision for cancellation to adequately perform.

Fixed frequency notch filters used in non-modulated laser radars use a reference signal at the same frequency of the narcissus signal to shift the target return signal and the narcissus signals within the bandwidth of a notch band rejection filter. These notch filters have a filtering band for attenuating a specific unwanted frequency signal, i.e., a fixed frequency narcissus signal. However, the bandwidth of the fixed frequency notch rejection filters have been too broad to allow for isolation of the frequency shifted target signals having frequencies in close proximity to the fixed frequency notch filter band.

Fixed frequency notch filtering has failed to successfully eliminate narcissus signals in a continuous linear modulated frequency laser radar system. Moreover, such fixed frequency notch narcissus filters do not provide for dynamic filtering of the modulated narcissus signals. In continuous radar systems using continuous linear frequency modulated chirp signals, the modulating signals generate frequency modulated narcissus signals having a dynamic frequency range through the modulated transmitted frequency range, rendering fixed frequency notch filters useless in frequency modulated laser systems. Hence, there exists a need for modulated narcissus signal filtering with up to 60 db attenuation. The disadvantages and limitations of the prior art fixed frequency notch filters and cancellation methods are solved using the present invention.

SUMMARY OF THE INVENTION

Figure 1:
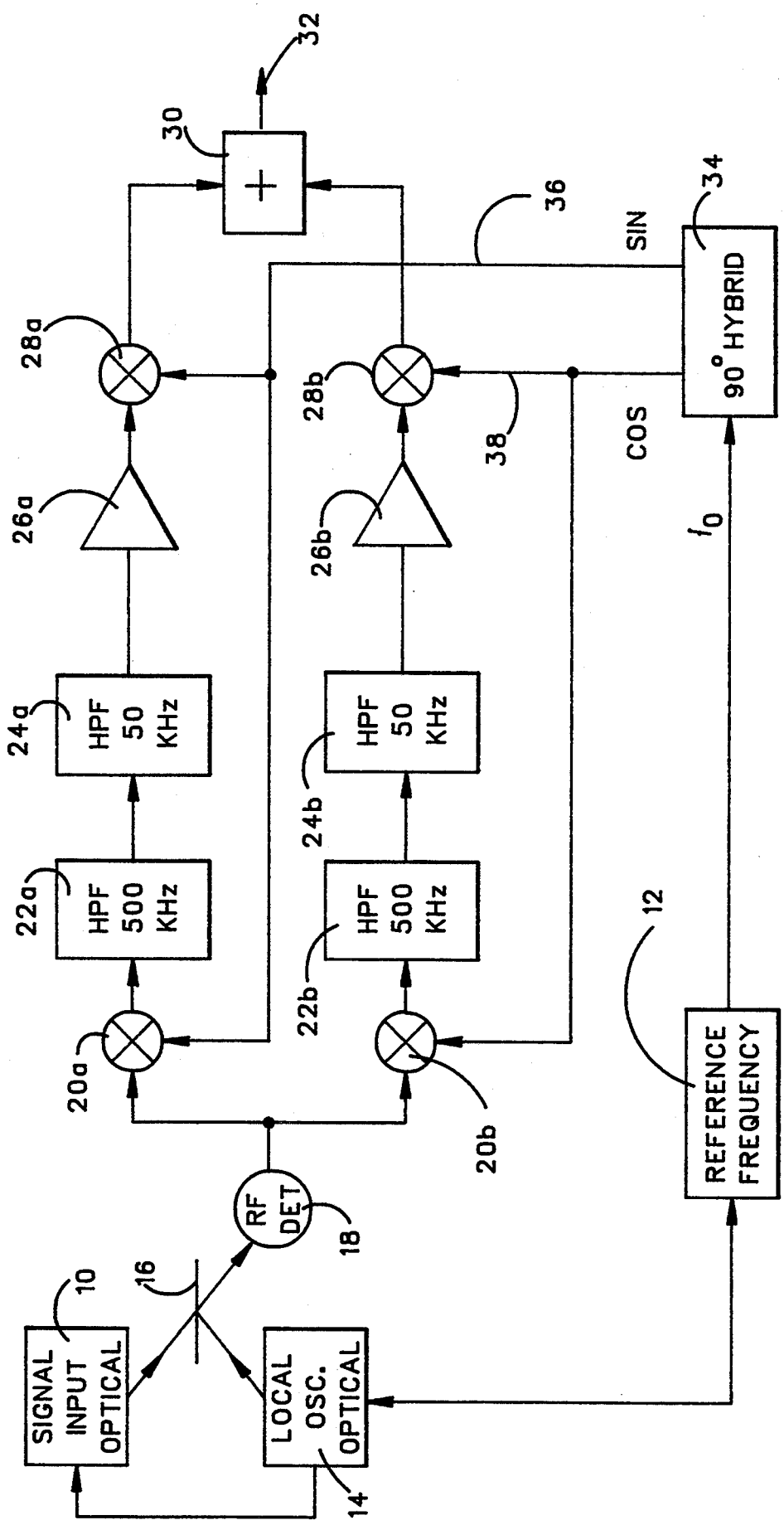
FIG. 1(a) through (f) is a block diagram of a dynamically tunable notch narcissus filter with associated waveform diagrams of respective signals within the filter having an RF detector.
Figure 1:
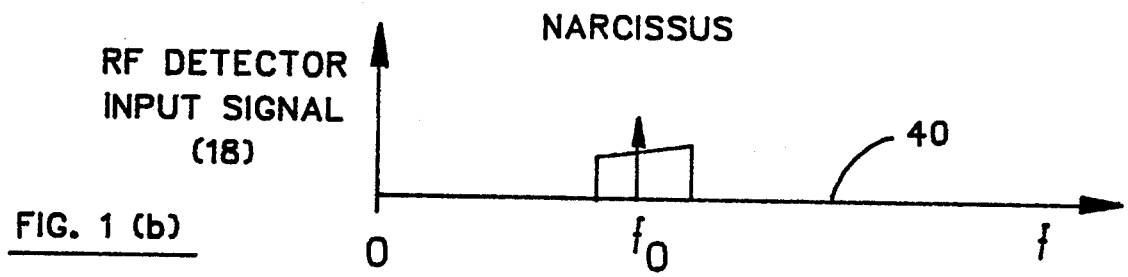
Figure 1:
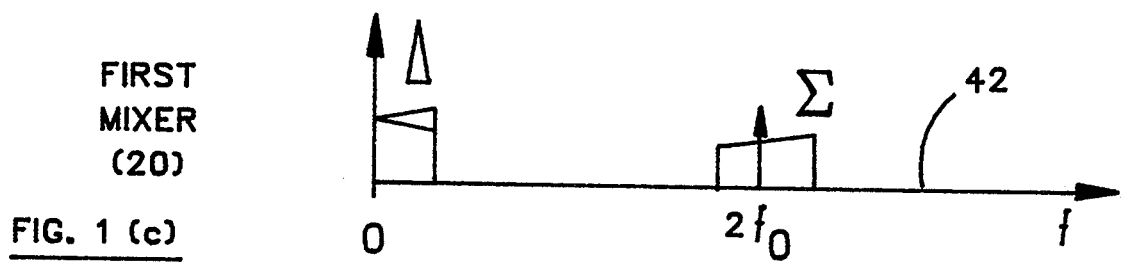
Figure 1:
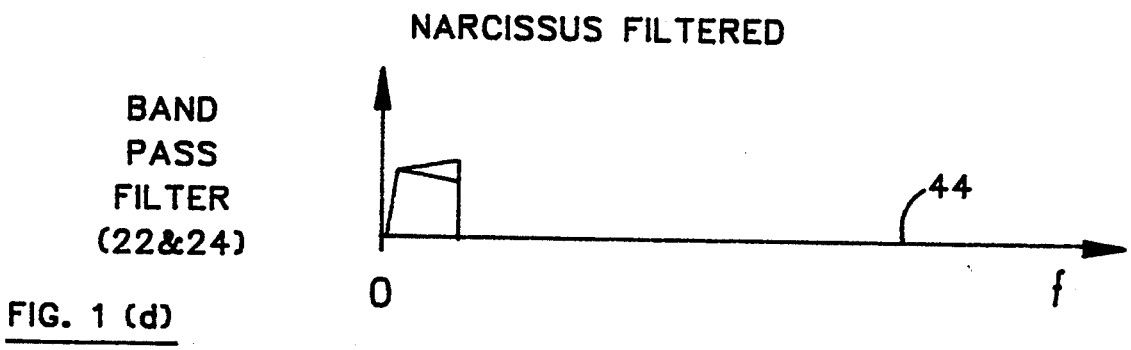
Figure 1:
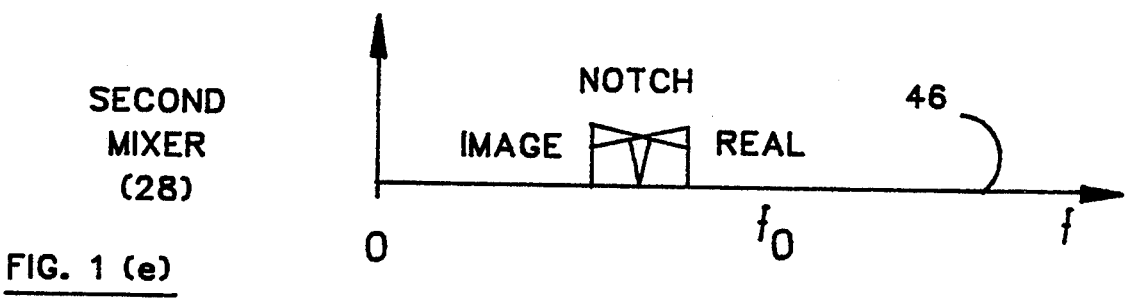
Figure 1:
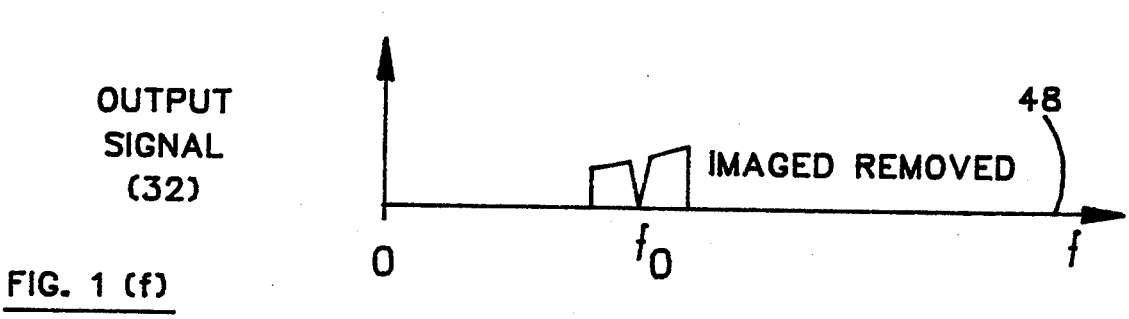
Figure 2:
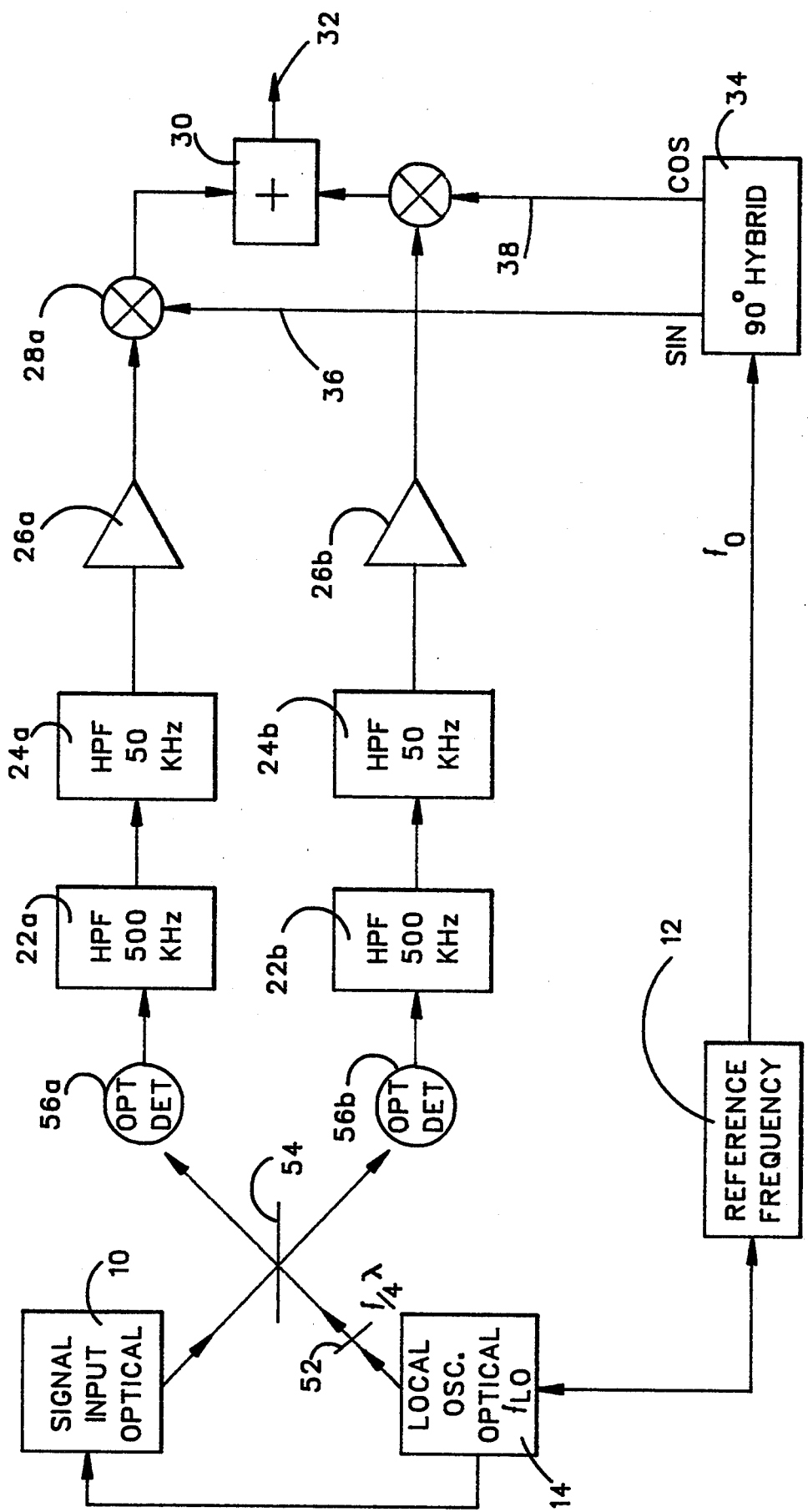
FIG. 2(a) through (f) is a block diagram of a dynamically tunable notch narcissus filter with associated waveform diagrams of respective signals within the filter using optical detectors.
Figure 2:
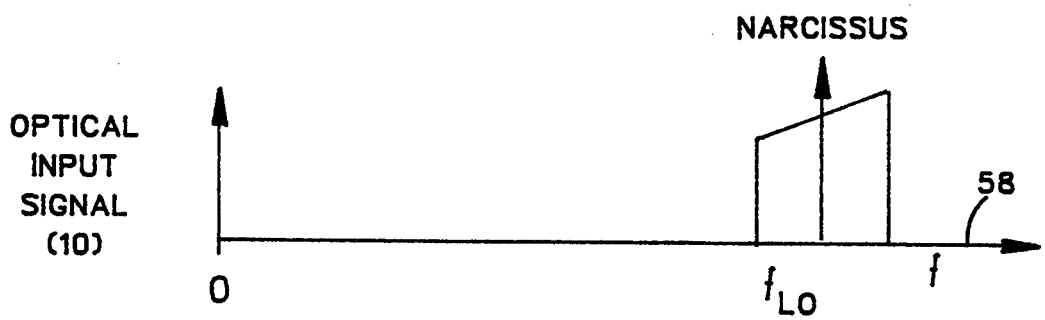
Figure 2:
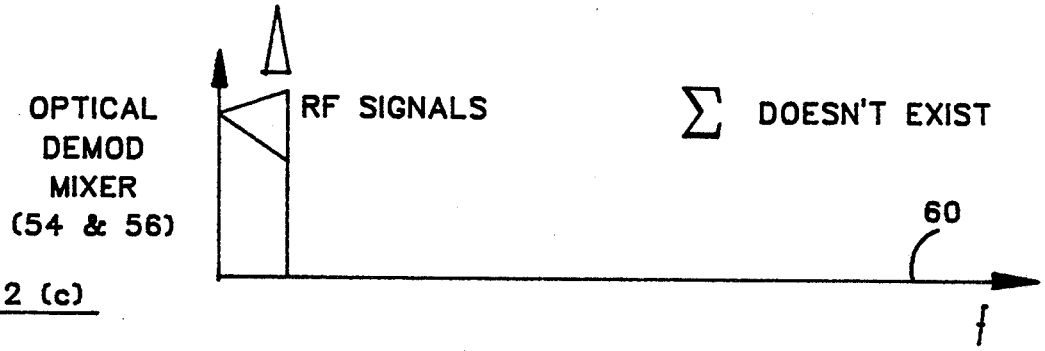
Figure 2:
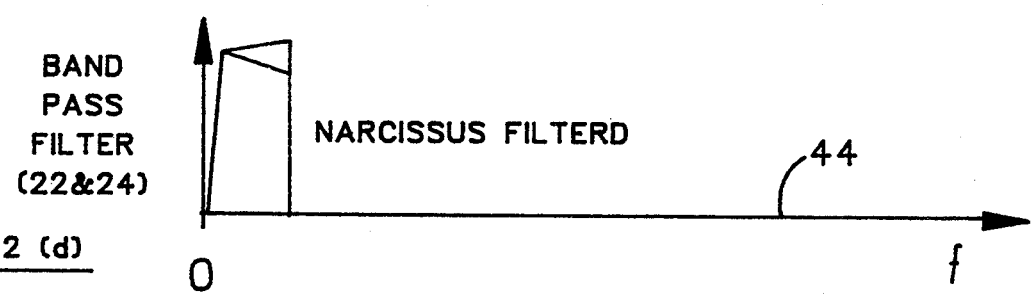
Figure 2:
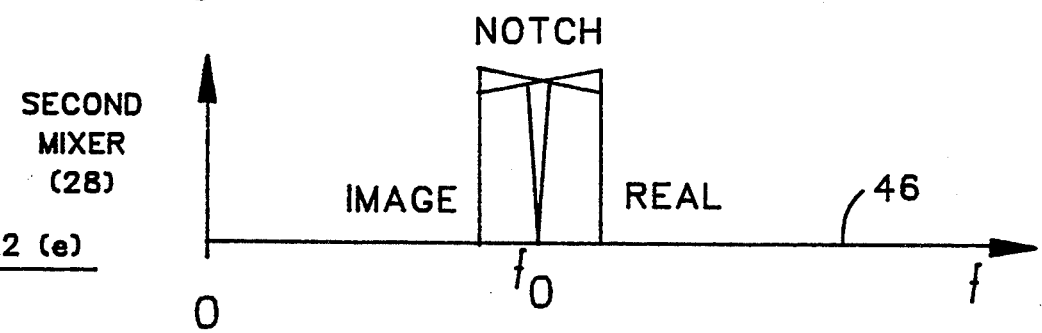
Figure 2:
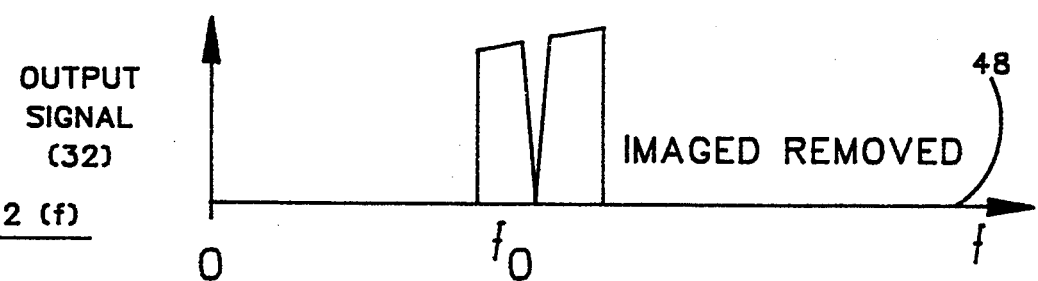

An object of the present invention is to reduce optical feedback.

Another object of the present invention is to reduce by 60 db the optical feedback in laser radar systems using electronic filtering.

Another object of the present invention is to reduce optical feedback by 90 db in laser radar systems using front end optical filtering.

Yet another object of the present invention is to reduce optical feedback using electronic or optical processing with sufficient narcissus filtering to sufficiently detect received target signals.

Still another object of the present invention is to reduce optical feedback by 60 db using electronic or by 90 db using optical filtering, with both methods using quadrature mixing and bandpass filtering in combination, for complex image rejection.

Still a further object of the present invention is to reduce optical feedback by 60 db using electronic signal processing, or by 90 db using front end optical signal processing, through the use of a dynamically tunable notch filter dynamically matching its notch frequency with the modulated frequency of the narcissus signal over its frequency range, with both processing techniques use quadrature mixing and band pass filtering to further eliminate unwanted images while enabling the detection of low level reflected target signals.

Compact laser radars require a common transmit and receive telescope antenna aperture. The removal of optical feedback, that is, the unwanted narcissus from the transceiver optics is required for proper laser radar operations. The common optical path of the transceiver laser radars have exhibited optical feedback at 50 db greater than the lowest level of the desired target reflected signal. Due to optical degradation and worst case optical feedback, 60 db in narcissus filtering is required. The present invention enables narcissus rejection filtering using electronic or front end optical signal processing. Alternative electronic signal processing or front end optical signal processing is used to achieve adequate narcissus filtering of the optical feedback by 60 db and 90 db of attenuation, respectively.

The reflected target signal which is time displaced from the reference signal due to travel time, is therefore frequency displaced from a local oscillator reference and narcissus signal due to their frequency modulation. Thus, the reflected target signal is frequency shifted from the instantaneous frequency of the narcissus signal.

A dynamically tunable notch narcissus filter is used. This narcissus rejection filter uses a frequency modulated reference signal which is derived from the frequency modulated laser transmit signal. When mixed, the reference signal shifts the narcissus signal to DC. The narcissus notch filter mixes the reference signal with the received signal, including both the target and narcissus signals, to frequency shift the narcissus signal to zero Hz, that is DC, and to shift the target signal towards DC. A high pass filter with a sharp cutoff effectively filters DC signals. The high pass filter with its sharp high pass cutoff filters out the DC narcissus signal while allowing to pass the frequency shifted target signal.

When mixing the received signal with the reference signal, an unwanted complex target image is generated. The electronic and front end optical signal processing techniques include quadrature mixing through the use of two identical signal paths. The two identical signal paths operate in quadrature allowing for the cancellation of the generated but overlapping complex target image signals. The band pass filter eliminates the unwanted narcissus signal while the quadrature mixing eliminates the unwanted complex target image signals. The result is the passing of only the wanted real target signal. The present invention obtains up to 60 db narcissus attenuation using electronic processing. The quadrature detection and mixing using front end optical signal processing achieves up to 90 db in narcissus attenuation.

Using the electronic signal processing techniques, the narcissus signal is filtered after detection, that is, after conversion from an optical beam into an RF frequency modulated signal. The laser radar emits a linear frequency modulated chirp signal modulated about 50 MHz and transmitted using a carrier signal typically at $3 \times 10^{13}$ Hz. The carrier is removed by conventional optical demodulation by applying both a reference beam and the received source signal perpendicular to each other and directed towards an optical thin-film hetrodyne demodulating beam splitter. The beam splitter demodulates the received input source signals into an RF beat signal which is the linear modulated frequency chirp signal that is detected by an RF detector. The demodulated RF signal is then processed by dynamic notch filtering where the center frequency of the 60 db notch filter varies, that is, where the center notch frequency of the filter is dynamically tuned to the same frequency of the narcissus signal thereby attenuating the narcissus over its instantaneous frequency modulation.

The front frequency mixer is used to provide frequency sums and differences of the narcissus and target signal. By mixing the reference signal and the received signal, the target and narcissus signals are effectively frequency shifted to DC, that is the difference, and also shifted to twice their frequency, that is their sum, such that the narcissus signal is shifted to DC with the target signal shifted off DC, in addition to generating the frequency sum signal at twice the reference frequency. A band pass filter with a high db per octave sharp cutoff which is easily obtainable for filtering DC, is used to effectively eliminate the DC component, that is, the difference narcissus component, and to eliminate the sum narcissus component and sum target signal components at the two-times sum narcissus component frequency, while passing only the target signal and its image components as frequency shifted towards DC. This signal processing filtering arrangement produces a dynamically tunable notch filter attenuating the narcissus signals including both sum and difference components, in addition to filtering any local oscillator bleed-through noise which is a residual of the original narcissus signal. The passed target signal including its image remains unattenuated. The target signal and its image is then mixed again with the reference signal thereby restoring the target signal to its original frequency, along with its image. The resulting target signal and its image are thus restored by mixing the reference frequency a second time. Dual path quadrature processing is used to cancel and eliminate the target image signal. The target image signal is canceled through summation processing. The quadrature mixing and summation processing adds the target image signal to a 180 degrees phase shifted target image signal, thereby canceling the imaginary image signals, while adding the target image to itself in phase, to provide a real surviving side band target signal. The surviving real target signal can then be compressed using Matched Filter Processing or like signal processing techniques for target detection and range determination.

A portion of the electronic filter, that is, the front end RF detection and quadrature mixing can be realized using alternative optical signal processing taking advantage of a higher dynamic range for improved notch narcissus filter attenuation. The front end optical processing employs quadrature local oscillator beams which are relatively alignment insensitive. A local oscillator is used to provide linear polarized beam. The linear polarized local oscillator beam is passed through a quarter wave plate to produce a horizontally polarized beam and a vertically polarized beam both of which form a circularly polarized beam. The vertically polarized beam portion lags the horizontally polarized beam portion by 90 degrees. These two linear components are separated with a thin film polarizer acting as a polarized beam splitter which is illuminated by the incoming optical signal including the narcissus and target signals. The polarized beam splitter directs the two resulting beams to two separate optical detectors having a high dynamic range in the order of 90 db. The two optical detectors act to demodulate the optical carrier and produce an RF narcissus and target input signal in quadrature. The RF input signal is then signal processed similar to the electric narcissus filter. The optical detectors have a 90 db dynamic range providing 90 db of attenuation which is superior over the 60 db dynamic range of the RF detectors and electronic first mixers providing 60 db in attenuation.

The dynamically tunable notch filter improves narcissus filtering and provides a means to filter or isolate a particular frequency modulated signal of interest from other superimposed signals. These and other advantages will become more apparent from the following detailed description of the preferred embodiment.

DETAILED DESCRIPTION OF THE PREFERRED EMBODIMENT

Referring to FIG. 1(a) through (f), a laser radar, not shown, received an optical input signal 10 which comprises a locally generated unwanted narcissus signal and a desired reflected far field target signal. The optical input signals are linear frequency modulation chirp signals modulating an intermediate RF reference frequency of about fifty megahertz. The linear frequency modulated chirp signals further modulate an optical local oscillator 14 providing a carrier signal typical at $3 \times 10^{13}$ cycles per second. The carrier signal of the optical input signal 10 is removed by conventional optical demodulation by applying both the local oscillator beam 14 and the received optical input signal 10 perpendicular to each other and directed towards a thin film polarizer, that is, an optical hetrodyne demodulating beam splitter 16 which demodulates the received input source signals 10 into an optical signal having an RF beat component which is the linear frequency modulated chirp signal and which is detected by an RF detector 18. The RF detector 18 provides a carrier-demodulated RF input signal including the target signal of interest and the unwanted narcissus signal.

The detected RF signal is then processed through two identical signal processing paths in quadrature. The two parallel processing paths include first mixers 20a and 20b, 500 KHz high pass filters 22a and 22b, fifty mega-hertz low pass filters 24a and 24b, amplifiers 26a and 26b, and second mixers 28a and 28b, respectively. The output of the second mixers 28a and 28b are summed by a summer 30 to provide an output signal at the output 32. The series connection of the high pass filters 22 and the low pass filter 24 act as a five hundred kilo-hertz to fifty mega-hertz band pass filter.

The RF reference signal $f_o$ 12 is used for signal processing. The reference frequency 12 is a frequency modulated reference signal synchronous with frequency modulation of the narcissus signal. The RF reference 12 provides a reference modulated frequency $f_o$ which may be time delayed to compensate for time delays associated with propagation delays between transmission and detection through the antenna, not shown. The RF reference signal 12 drives a 90 degree hybrid providing a SIN reference signal 36 and a COS reference signal 38 which are 90 degrees phase shifted from each other. The SIN reference signal 36 is applied to the first SIN mixer 20a and second SIN mixer 28a of the first quadrature path while the COS reference signal 38 is applied to the first COS mixer 20b and the second COS mixer 28b of the second quadrature path.

The detected RF signal from the RF detector 18 includes the superimposed RF narcissus signal and the reflected RF target signal. The target signal is time displaced from the RF reference signal and the narcissus signal due to the travel time of the reflected target signal, and is therefore frequency displaced from both the RF reference signal 12 and the narcissus signal. The RF detector input signal 18 is shown as equaling the reference frequency signal $f_o$, and is linearly frequency modulated over its frequency modulated bandwidth as shown by waveform 40. The sloped amplitude of the narcissus bandwidth of waveform 40 is drawn as such to merely distinguish real and imaginary signal components during quadrature processing. The reflected target signal, not shown, is frequency shifted from the instantaneous reference frequency $f_o$, but typically lies within the frequency modulated bandwidth of waveform 40 but having an approximate 50 db lower signal amplitude level.

The first mixers 20a and 20b mix the detected RF signal 18 with the quadrature signals 36 and 38, respectively. This mixing produces a frequency sum and frequency difference as shown in waveform 42. The frequency sum signal is located at $2f_o$, and the frequency difference is located at zero Hz, that is DC, because the narcissus signal and the reference signal 12 are synchronously frequency modulated at the same frequency $f_o$. The bandwidth of the narcissus signal as shifted to DC is shown as an overlapping positive side-band frequency bandwidth due to spectrum fold-over.

The first mixers 20 mix in quadrature the reference signals 36 and 38 with the detected RF signal 18, including both the target signal and narcissus signal, to frequency shift the narcissus signal to zero Hz, that is DC, and to frequency shift the target signal towards DC. The band pass filters comprising the high pass filters 22 and low pass filters 24 have a band pass of 500 KHz to 50 MHz with a sharp low end cutoff effectively filtering DC signals to which was shifted the narcissus signal. The bandpass filters, including filters 22 and 24, thus attenuate the narcissus signal, but pass the target signals which exist off DC, but within the bandwidth of the band pass filter. The band pass filters 22 and 24, with their sharp cutoff effectively filters out not only the DC narcissus signal while allowing to pass the target signal, but also filters out the $2f_o$ sum signal as shown in waveform 44. This filtering arrangement produces a dynamically tunable notch filter attenuating the narcissus signals including both sum components and narcissus DC components, in addition to filtering any local oscillator bleed-through noise which is a residual of the original narcissus signal at the output of the mixers 20.

The filtered signal at the output of the amplifiers 26 is then mixed again in quadrature with the reference signals 36 and 38 by the second mixers 28a and 28b, respectively, to frequency shift by the reference frequency $f_o$, and to restore the filtered signal back to its original frequency, as shown in the waveform 46. The narcissus signal is not frequency shifted back to the reference frequency $f_o$ because it had been filtered and thus eliminated by the attenuating notch first created by the high pass cut-off shown at DC in waveform 44. When mixing the filtered signal with the reference signal 36 and 38 by the second mixers 28, the surviving target signal is shifted back towards the frequency reference $f_o$ to restore the target signal to its original frequency. However, this mixing of the filtered signal with the reference signal generates an unwanted complex target image. The real and image target signal are shown by bandwidth representations in waveform 36, with a filtering notch representing the elimination of the narcissus signal. The band-passed target signal including its image remains unattenuated.

Dual path quadrature processing is used to cancel and thereby eliminate the target image signal. The quadrature COS mixing relative to the quadrature SIN mixing, that is, the quadrature processing, adds the target image signal to an identical, but 180 degrees phase shifted target image signal using the summer 30, thereby canceling the image target signals at the output 32 as represented in waveform 48. The summer 30 also adds the surviving real target signal to itself, but in phase, to provide a surviving single side band real target signal at the output 32 of the summer 30. The surviving real target signal can then be compressed using Matched Filter Processing or like signal processing techniques for target detection and range determination.

As the narcissus frequency, that is, the reference frequency $f_o$ 12, is frequency modulated through its bandwidth, the frequency of the filtering notch varies accordingly through that same bandwidth. The notch filter dynamically changes its notch center frequency and is consequently tuned to the RF reference frequency so that notch narcissus filtering is achieved even though the narcissus signal is frequency modulated. The notch filter synchronously moves through its frequency bandwidth as the narcissus signal is frequency modulated.

The dynamic notch filter as shown in FIG. 1(a) provides up to 60 db in attenuation enabling adequate detection of the surviving real target signal. The attenuation is limited by the RF detector 18 and mixers 20 because of their dynamic range. The frequency of the notch filter is dynamically tunable to the same frequency of the narcissus signal thereby attenuating only the narcissus through its instantaneous frequency modulation, while allowing only the target signal to pass. A portion of the electronic narcissus filter, that is, the front end optical detection and first quadrature mixing can be realized using alternative optical signal processing techniques with up to 90 db dynamic range for improved notch filter attenuation.

Referring to FIG. 2(a) through (f), a local oscillator beam 14 is used to provide a linear polarized beam. The linear polarized local oscillator beam 14 is passed through a quarter wave plate 52 to produce both a horizontally polarized beam and a vertically polarized beam forming a circularly polarized beam which is relatively alignment insensitive. The horizontally polarized beam lags in quadrature the vertically polarized portion by 90 degrees. These two linear polarized optical beams are separated by a thin film polarizer functioning as a polarizing beam splitter 54 directing in quadrature two mixed resulting beams to two separate optical detectors 56a and 56b having a high dynamic range in the order of 90 db. That is, after passing through the quarter wave plate 52, the local oscillator beam carries a 90 phase shift between its two component beams both of which are mixed with the incoming optical signal 10 by the polarizing beam splitter 54. The polarizing beam splitter 54 is arranged to split the incoming optical signal equally into two beams respectively mixed with the two polarized beams from the quarter wave plate 52, and respectively directed onto the detectors 56. The incoming optical signal is shown in waveform 58 as being frequency modulated about the local oscillator frequency $f_{lo}$ which is frequency shifted from the reference frequency $f_o$. Implicitly, the bandwidth of the frequency modulation of the transmitted signal can be centered, that is, shifted to or from a predetermined carrier or intermediate frequency by conventional RF or optical mixing. The polarizing beam splitter 54 produces two mixed beating beams illuminating the detectors 56. The two mixed beams both contain an optical carrier component frequency modulated by an RF component, but are phase shifted in quadrature. The optical detectors 56 provide a frequency shifted output signal centered at DC, the input signal having been demodulated as shown in waveform 60. No summation component will appear as is commonly generated by electronic mixers. The DC centered signal is produced by the detectors 56 when respectively illuminated by the two mixed beams from the polarizing beam splitter 54. The quadrature DC shifted signals provided by the optical detectors 56 are communicated to the band pass filters 22 and 24. The quarter wave plate 52, polarizing beam splitter 54 and optical detectors 56 function in the optical domain, replacing the optical beam splitter 16, detector 18 and electronic input mixers 20 in the RF electrical domain, in that, both produce the RF narcissus and target signals in quadrature.

The quarter wave plate 52, polarized beam splitter 54 and optical detectors 56 function to demodulate optical input signal 10 for demodulating the optical carrier and producing an RF input signal comprising the RF narcissus signal and target input signal in quadrature. The RF signal is then signal processed similar to the RF electrical narcissus filter shown in FIG. 1(a). The optical detectors have a 90 db dynamic range which is superior over the 60 db range of the electronic input detecting mixers.

As with the electronic signal processing, the front end optical signal processing techniques use quadrature mixing through the use of two identical signal paths to eliminate the target image signal. The two identical signal paths operate in quadrature for the cancellation of generated but overlapping complex target image signals. The band pass filtering again eliminates the unwanted narcissus signal while the quadrature mixing eliminates the unwanted complex target image signals. The result is the passing of only the wanted real target signal. The present invention obtains up to 60 db narcissus attenuation using electronic processing. The front end quadrature detection and mixing using front end optical signal processing achieves up to 90 db in narcissus attenuation.

Figure 3:
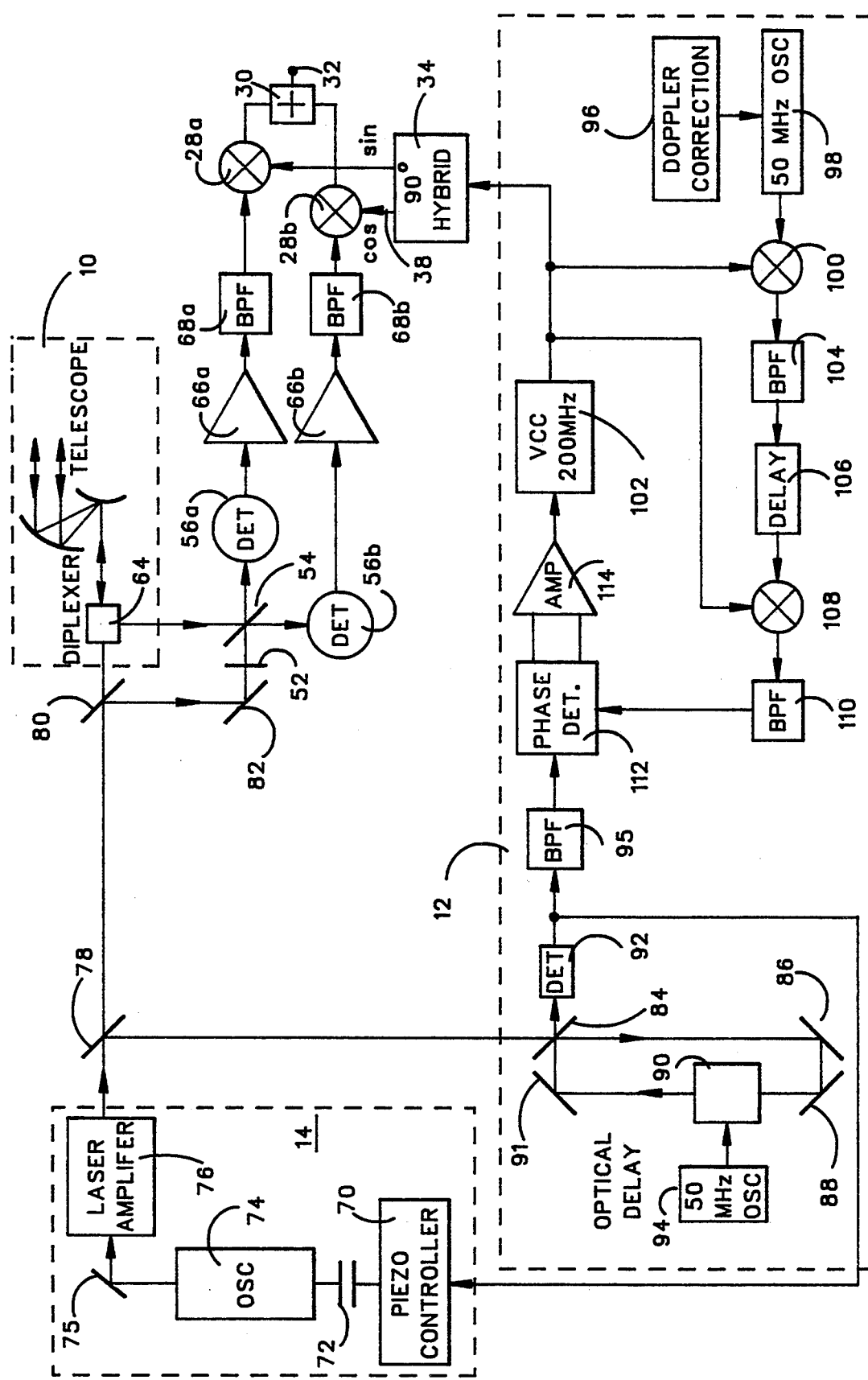
FIG. 3 is block diagram of laser radar using a dynamically tunable notch narcissus filter having an optical detector.

Referring to FIG. 3, a laser radar is modified to include a dynamically tunable narcissus filter. The input signal source 10 includes a telescope 62 for transmitting a laser radar beam into the far field to illuminate targets, not shown, of interest and for receiving reflected target signals. The input signal source includes a diplexer 64 for communicating a local oscillator beam from the local oscillator 14 to the telescope antenna and for communicating the reflected target image signal to the polarizing beam splitter 54. The illuminated telescope 10 also generates narcissus signals which are also optically fed-back onto the polarizing beam splitter 54 which communicates the resulting beams onto the optical detectors 56. The optical detector 56a and 56b provide amplifiers 66a and 66b, with an RF signal frequency shifted to DC, respectively. The RF frequency shifted signal is filtered by band pass filters 68a and 68b to eliminate the narcissus signal. The RF filtered frequency shifted signal is mixed in quadrature by mixers 28a and 28b with reference signals 36 and 38 to frequency shift the filtered frequency-shifted signal to an intermediate center frequency having the same linear frequency modulation as the local oscillator 14. The output of the mixers 28 are summed by the summer 30 to eliminate the target image signal and provide only the real target signal at the output 32. The output signal at the output 32 is a linear frequency modulated target signal centered at the 200 mega-hertz intermediate frequency suitable for further signal processing.

The local oscillator 14 includes a piezo controller 70 used to stimulate a piezo driver 72 which excites a master oscillator 74 for providing a linear frequency modulated chirp signal centered at an optical carrier which is communicated through mirror 75 and then amplified using a laser amplifier transmitter 76 providing the linear frequency modulated local oscillator beam. The local oscillator beam is passed through a mirror 78 which reflects a portion of this local oscillator beam to the reference frequency generator 12, and communicates the remaining portion to another mirror 80. The mirror 80 reflects a portion of the remaining local oscillator beam through another mirror 82 to the quarter wave plate 52. The mirror 80 also communicates a remaining portion of the local oscillator beam through the diplexer 64 for transmission into the far field through the telescope antenna 62.

The mirror 78 directs a portion of the local oscillator beam into the reference frequency generator 12 which generates the LFM 200 MHz reference signal that drives the hybrid 34 with the same frequency modulation as produced by the local oscillator 14. An optical delay loop is used to detect the frequency modulation of the local oscillator beam. This optical delay loop includes an optical beam splitter 84, mirrors 86 and 88, acousto-optical cell 90, and mirror 91. The mirror 91 reflects a resulting optical beam from the cell 90 through the beam splitter 84 onto an optical hetrodyne demodulating RF detector 92. The acousto-optical cell 90 is driven by a fifty mega-hertz oscillator 94, and driven by the local oscillator 14, to generate a frequency translated optical beam which frequency shifts the optical carrier by fifty mega-hertz. The optical beam splitter 84 mixes the frequency shifted local oscillator beam from the cell 90 with the unshifted local oscillator beam from the mirror 78 into an optical signal having a fifty mega-hertz centered RF beat signal component which is frequency modulated proportionately to the rate of change of the modulated frequency of the local oscillator beam, and which is detected by an RF optical detector 92.

The output of the detector 92 is an RF signal centered at fifty mega-hertz plus the derivative of the frequency modulation of the linear frequency modulated chirp signal provided by the local oscillator 14. The detector 92 detects the rate of change of the linear frequency modulated chirp signal which is also the rate of change linear frequency modulated (LFM) chirp laser local oscillator beam which is frequency centered at the local oscillator carrier frequency. The detector 92 provides a fifty mega-hertz signal which is frequency modulated proportionately to the rate of change of the modulated frequency of the optical local oscillator beam, and which is isolated by a band pass filter 95.

The fifty mega-hertz signal generated by the detector 92 is also used to control the piezo controller 70 for laser stabilization for holding the local oscillator 14 on band center to compensate for laser frequency drifts which may occur over time and temperature. The oscillator 74 generates the linear frequency modulated signal at the optical carrier.

A Doppler correction 96 provides a signal representative of Doppler shifts associated with movement and drives a fifty mega-hertz oscillator 98 which is frequency modulated to compensate for any Doppler shifts. This frequency modulated Doppler signal is mixed by mixer 100 with the 200 mega-hertz signal provided by a VCO 102 to provide a 150 mega-hertz frequency modulated signal which is isolated by a band pass filter 104 and which drives an electronic delay 106.

The time delay of the optical loop including mirrors 84, 86, 88 and 92 is inherent in the loop optical processing. The electronic time delay 106 is used to compensate for, and is identical in function to this optical loop delay so that the linear frequency modulation of the local oscillator beam is synchronous with the linear frequency modulation of the signal generated by the 200 mega-hertz VCO 102. The 200 mega-hertz VCO frequency modulated signal is mixed by mixer 108 with the 150 mega-hertz time-delayed Doppler-compensated signal to provide a frequency modulated fifty mega-hertz signal which is frequency modulated proportionately to the rate of change of the LFM chirp signal provided by the VCO 102, and which is isolated by a band pass filter 110. This isolated fifty mega-hertz frequency modulated signal passed by the band pass filter 110, and the fifty mega-hertz linear frequency modulated signal passed by the band pass filter 95 drives a phase detector 112 which controls the VCO 102 through an amplifier 114. The VCO 102 provides a Doppler-compensated linear frequency modulated chirp signal centered at 200 mega-hertz intermediate frequency which is linear frequency modulated synchronously with the local oscillator 14, though other centered intermediate frequencies may be used.

The optical loop elements 84, 86, 86, 88, 90 and 91 and the RF electronic loop elements 102, 100, 104, 106 and 108 perform similar functions in order to generate a synchronous RF frequency modulated signal from the local oscillator beam. Both have a 50 mega-hertz source, 94 and 98, both have a loop delay, that is, electronic delay 106 and optical loop delay of 84, 86, 90 and 91, both have input mixing by beam splitter 84 and mixer 108, and both have internal mixing by mixer 100 and cell 90. The time delay 106 provides linear phase shifting with frequency centered at fifty mega hertz such that when mixed by mixer 108 with the 200 megahertz LFM signal, the mixer provides a fifty-mega hertz signal identical to the signal produced by the detector 92.

As may now be apparent, the front end optical mixing and demodulation provided by the quarter wave plate 52, polarizing beam splitter 54 and detectors 56 demodulates the linear frequency modulated local oscillator beam to DC, whereas the second mixers 28 frequency shift the target signal to a linear frequency modulated signal centered at a 200 mega-hertz intermediate frequency suitable for subsequent processing.

The dynamically tunable narcissus filter improves narcissus filtering and provides a means to filter or isolate a particular frequency modulated signal of interest from other frequency modulated signals of interest. The dynamically tunable narcissus filter of the present invention is particularly useful in continuous wave laser radar systems. The dynamically tunable filter can be applied to pass a desired component signal mixed with an unwanted frequency modulated signal. Other modifications can be applied to pass, for example, only the narcissus signal. The bandpass filter could be changed to a low pass filter for isolating and passing only the signal operating at the reference modulated frequency. While the preferred embodiment, shifted and unwanted frequency modulated signal to DC for filtering, other modifications may shift a wanted or unwanted signal to a particular frequency suitable for filtering or isolation. While those skilled in the art may design further modifications, those modifications may nonetheless fall within the spirit and scope of the following claims.

What is claimed is:

1. A dynamically tunable filter for processing a frequency modulated input signal, said filter comprising a first mixer means for mixing said input signal with a reference modulated frequency to frequency shift said input signal to a predetermined frequency, band pass filtering means connected to said first mixer means, said filtering means for filtering said frequency-shifted input signal to generate a filtered frequency-shifted input signal, and a second mixer means for mixing said filtered frequency-shifted input signal with said reference modulated frequency.

2. The dynamically tunable filter of claim 1 wherein said first mixer means mixes said frequency modulated input signal to frequency shift said input signal to DC.

3. The dynamically tunable filter of claim 1 wherein said frequency shifting of said second mixer frequency shifts said filtered input signal to frequency modulate said filtered input signal as the input signal was originally frequency modulated prior to being first mixed by said first mixer.

4. The dynamically tunable filter of claim 1 wherein said filtering means comprises a high pass filter.

5. The dynamically tunable filter of claim 1 wherein said first mixer comprises, beam splitter means illuminated by said input signal, said beam splitter means for frequency shifting said frequency modulated input signal, and an optical detector means illuminated by said beam splitter and providing said frequency-shifted input signal.

6. The dynamically tunable filter of claim 1 wherein said first mixer comprises, polarizer means illuminated by said input signal, said polarizer means for demodulating said frequency modulated input signal, an RF detector means illuminated by said polarizer means and providing said frequency modulated input signal, and electronic mixer means for mixing said frequency modulated input signal to frequency shift said input signal.

7. A dynamically tunable filter for processing a frequency modulated input signal having an unwanted frequency modulated signal generated by a reference modulated frequency, and having a desired signal, comprising a first mixer means for mixing said input signal with said reference modulated frequency for shifting said unwanted frequency modulated signal to DC and for shifting said desired signal towards DC, band pass filtering means connected to said first mixer means, said band pass filtering means for filtering said unwanted frequency modulated signal and for passing said desired signal, and a second mixer means for mixing said passed desired signal with said reference modulated frequency.

8. The dynamically tunable filter of claim 7 wherein said first mixer means comprises, beam polarizer means for demodulating said input signal, RF detector means for detecting said demodulated input signal, and electronic mixer means for mixing said reference modulated frequency with said demodulated input signal to shift said unwanted frequency modulated signal to DC and for shifting said desired signal towards DC.

9. The dynamically tunable filter of claim 7 wherein said first mixer comprises beam splitter beam illuminated by said reference modulated frequency for demodulating and frequency shifting said input signal, and an optical detector illuminated by said beam splitter for detecting said unwanted frequency modulated signal shifted to DC and for detecting said desired signal shifted towards DC.

10. The dynamically tunable filter of claim 7 wherein said second mixer mixes said passed desired signal with said reference modulated frequency to frequency shift and restore the frequency modulation of said passed desired signal.

11. A dynamically tunable notch filter for processing a frequency modulated input signal having an unwanted frequency modulated signal frequency modulated by a reference modulated frequency, and having a desired frequency modulated signal, said notch filter comprising a first set of mixer means for mixing said input signal in quadrature with said reference modulated frequency for frequency shifting said unwanted signal to DC, and for shifting said desired signal towards DC, band pass filtering means connected to said first sets of mixer means, said filtering means for filtering in quadrature said frequency-shifted input signal, said filtering mean for attenuating said unwanted signal and for passing said desired signal, and a second set of mixer means for mixing in quadrature said passed frequency-shifted desired signal with said reference modulated frequency for frequency shifting said desired signal to its original frequency modulation.

12. The dynamically tunable notch filter of claim 11 wherein said first set of mixer generate unwanted high frequency sum component signals in quadrature, said band pass filtering means comprises, a high pass filter with a DC cut off to attenuate and filter out said unwanted signal in quadrature, but passing said desired signal in quadrature, and passing said sum component signals, and a low pass filter for passing said desired signal in quadrature and for filtering said sum component signals.

13. The dynamically tunable notch filter of claim 11 wherein said notch filter further comprises, a summer means connected to both of said second set of mixer means, said summer means adding in quadrature said passed desired signal for eliminating image signal generated by said first set mixer means and said second set of mixer means.

14. The dynamically tunable notch filter of claim 11 further comprising, hybrid means driven by said reference modulated frequency for generating in quadrature a SIN reference and a COS reference respectively driving in quadrature one of said first set of mixer and one of said second set of mixers.

* * * * *